Sept. 5, 1939. R. H. CROUCH 2,172,274
STRAIGHT-LINE CUT-OFF SAW
Filed Feb. 18, 1937 3 Sheets-Sheet 1
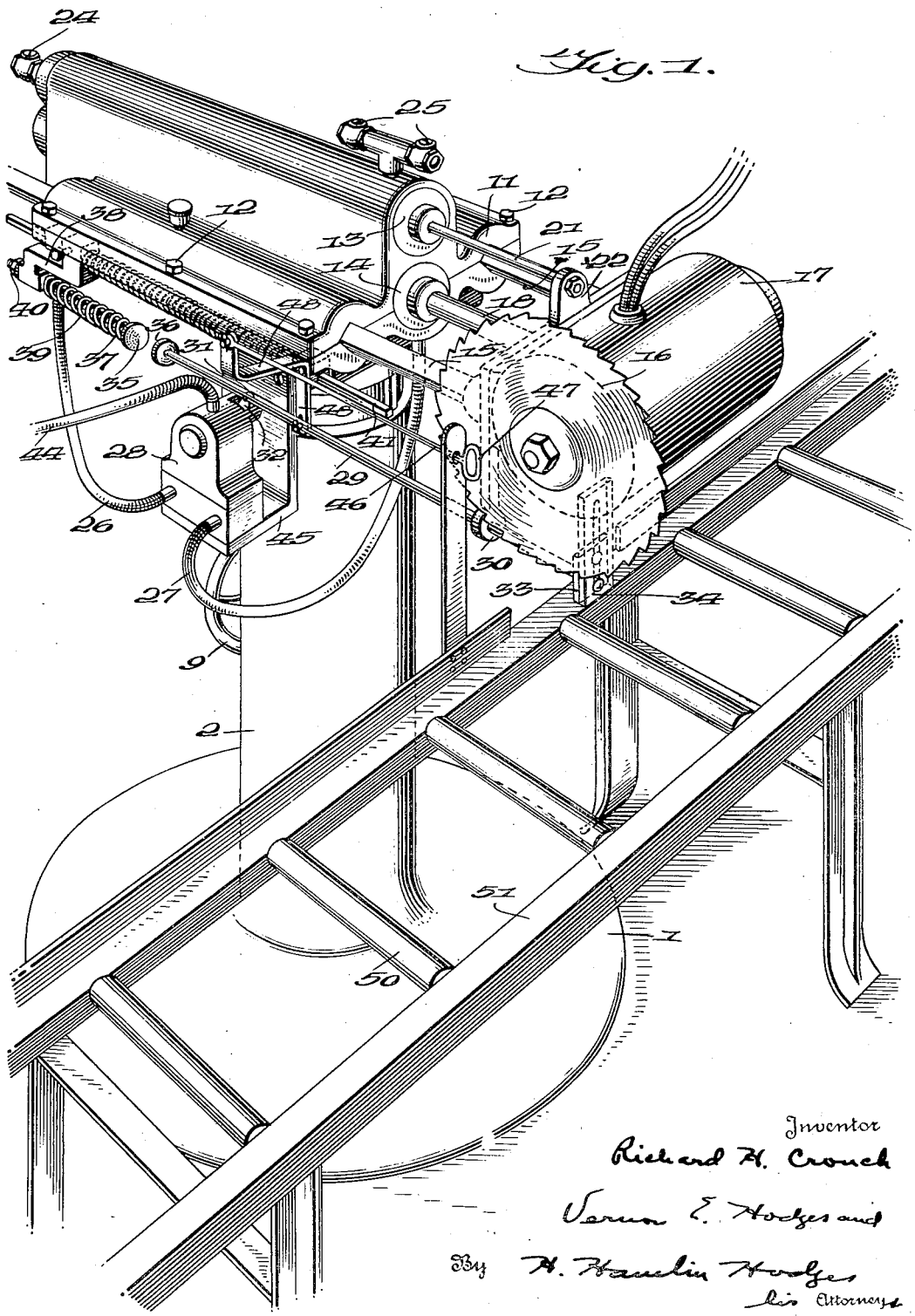

Sept. 5, 1939.  R. H. CROUCH  2,172,274
STRAIGHT-LINE CUT-OFF SAW
Filed Feb. 18, 1937  3 Sheets-Sheet 2
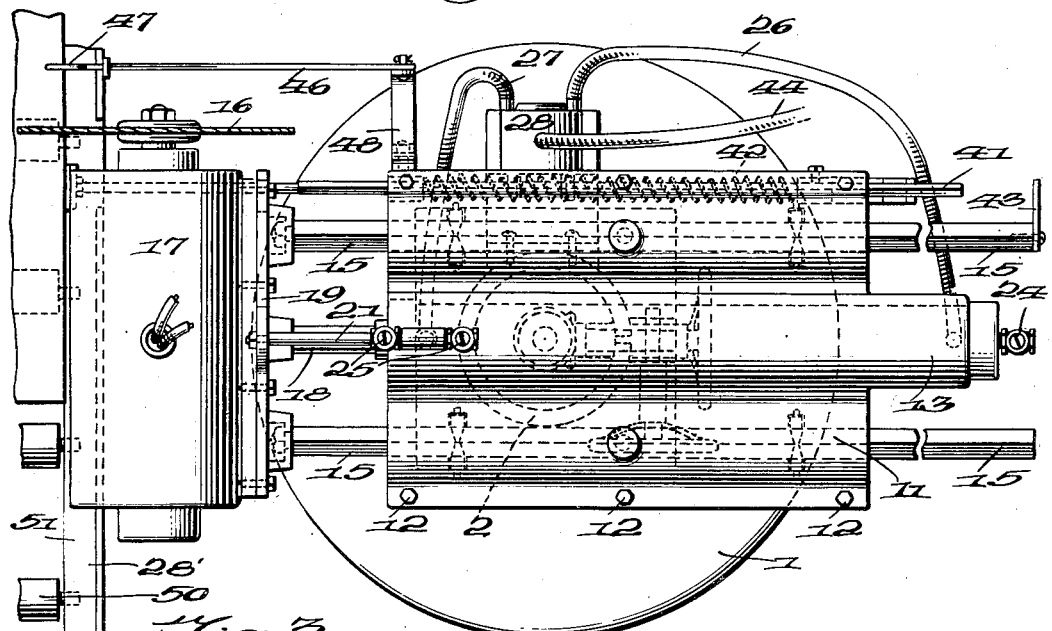
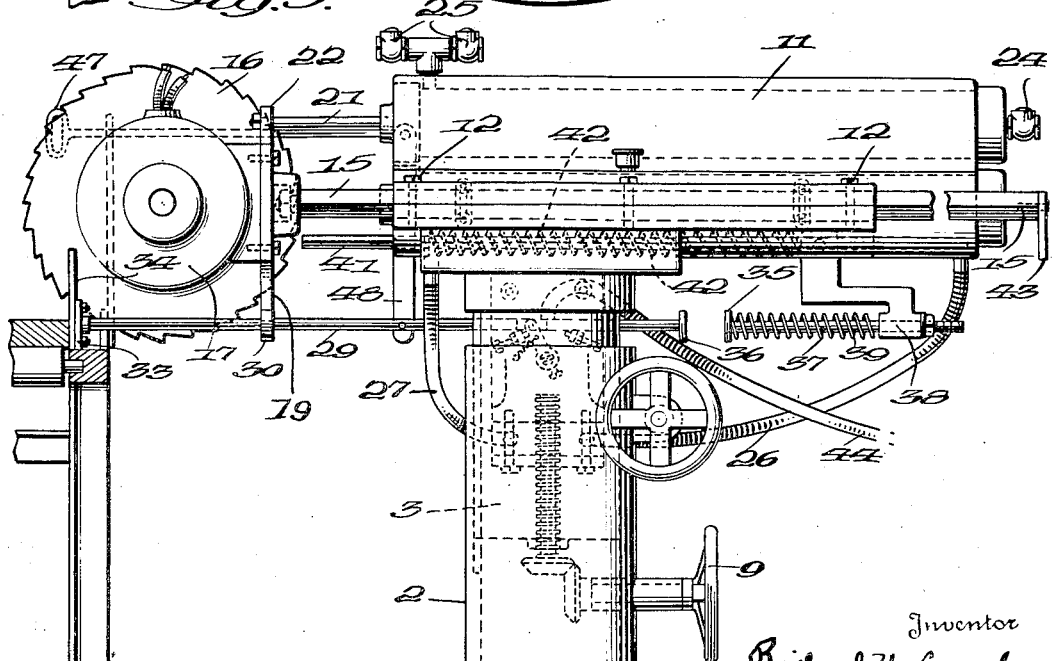

Sept. 5, 1939.　　　R. H. CROUCH　　　2,172,274
STRAIGHT-LINE CUT-OFF SAW
Filed Feb. 18, 1937　　　3 Sheets-Sheet 3
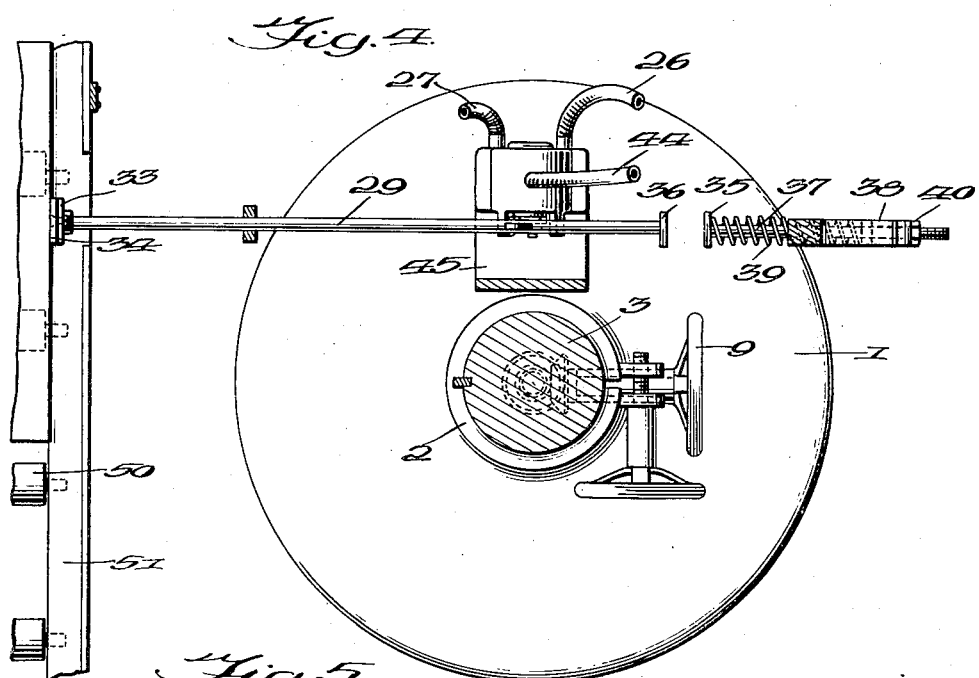
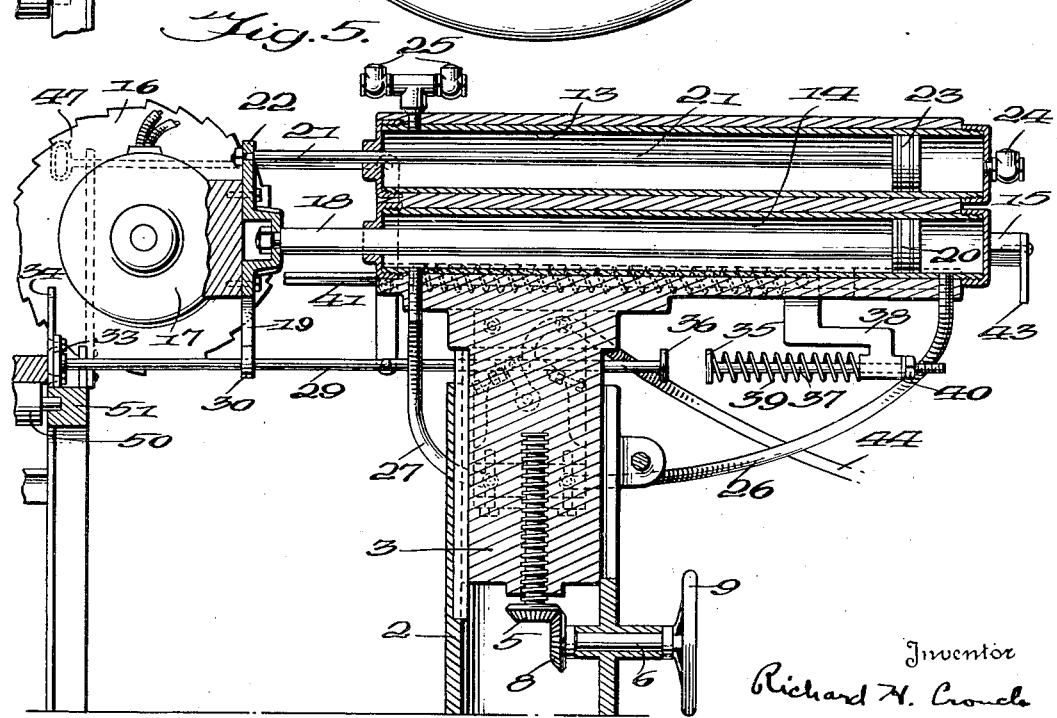

Patented Sept. 5, 1939

2,172,274

UNITED STATES PATENT OFFICE 2,172,274

STRAIGHT-LINE CUT-OFF SAW

Richard H. Crouch, Pulaski, Va., assignor to Automatic Machinery Corporation, Pulaski, Va., a corporation of Virginia Application February 18, 1937, Serial No. 126,513

5 Claims. (Cl. 143—47)

My invention relates to an improvement in straight line cut-off saws.

This invention is really a development of, and an improvement on, the cut-off saw set forth in my application, Serial No. 108,112, filed in the U. S. Patent Office on October 28, 1936.

My present invention consists in self-contained mechanism for raising and lowering the saw to cut stock of varying thicknesses, and means for either automatically or manually controlling a valve which directs the fluid pressure media to either end of the cylinder for moving the saw back and forth.

In the accompanying drawings:

Fig. 1 is a view in perspective;

Fig. 2 is a top plan view;

Fig. 3 is a view in side elevation;

Fig. 4 is a horizontal section through the pedestal, parts showing in plan; and

Fig. 5 is a vertical longitudinal sectional view on the line 5—5 of Fig. 2, looking in the direction of the arrows.

From the head 1, the main tubular column 2 is erected. A head 3 is fitted within the upper end of the tubular column 2 where it is slidable up and down, it being adjustable to raise and lower the saw mechanism by any approved means, such as a screw 4 which turns in threads in the lower end of the head 3 and has a bevel gear 5 on its lower end. A shaft 6 is mounted to turn in bearings 7 in one side of the column, and this has a bevel-gear 8 which meshes with the bevel-gear 7 and the hand-wheel 9 on the outer end by which the operator raises and lowers.

The head carries the base plate 10, over which the top plate 11 is securely held by bolts 12 on each side.

Two cylinders 13 and 14 extend parallel with each other and longitudinally of the top plate, the upper one 13 wholly within the plate and the lower one between the base plate 10 and top cover 11.

The sides of this base plate 10 and top cover 11 form angular channels in which are received the slide-rods 15, the forward ends of which rods are secured to the plate 19 to which the motor 17 is attached, these slide rods 15 and the piston 18 constituting a moving support for the saw 16 and motor 17.

A saw 16 is secured to the armature shaft of the motor 17, and the motor is secured to the end of the piston-rod 18 by means of plate 19. This piston rod 18 extends rearwardly through the cylinder 14 to the piston 20. A similar piston-rod 21 is secured to the lug 22 on the plate 19, and this rod 21 extends through the upper cushioning cylinder 13 and has a piston 23 thereon fitted to the cylinder. This is a cushioning cylinder, as will be explained, and check-valves 24 and 25 located at opposite ends of this cylinder regulate the inflow and outflow of air with the cushioning action of this cylinder.

Pipes or hose 26 and 27 lead from the valve 28 to the opposite ends of the cylinder 14 for controlling the movement of the saw back and forth across table 51. The valve may be operated both automatically and manually. A controlling rod 29 is slidably mounted in the support 30, and a pin 31 pivotally connects this rod with the valve-stem 32. The forward end of the controlling rod 29 has a plate 33 secured thereon, and this is slidably connected with a gravity stop 34 in position to be struck by the lumber regardless of the elevation of the saw for different thicknesses of stock, against which some part of the board is pushed to trip the mechanism and start the saw moving toward the board to be sawed. When the edge of the board is pressed against this gravity-stop 34, the controlling rod 29 is moved backward and with it the valve-stem 32 is pushed back, thus reversing the valve 28.

This causes the discharge of the fluid through the pipe or hose 26 to the outer end of the cylinder 14, whereupon the pressure upon the piston 20 feeds the saw forwardly to make the cross-cut through the stock.

As it does this, when it moves the predetermined distance, the spring-cushioned bumper 35 strikes the bumper 36 on the end of the rod 29, causing the valve to shift and the pressure fluid within the valve chamber through the pipe or hose 27 to exert its pressure on the other end of the piston 29, thereby reversing the movement of the saw 16. As it travels in this direction, the movement is finally cushioned by the piston 23 within the cylinder 13.

The bumper 35 is secured on the end of a rod 37 which is slidable in the bracket 38 and the spring 39 sleeved around the rod 37 is confined between the bumper 35 and the bracket 38 for the purpose of cushioning the bumper 35, and thereby moderating the shock when the bumpers 35 and 36 engage each other. To insure the proper cushioning of the bumper 35, a nut 40 on the end of the rod 37 is turned to the right or left.

The bracket 38 is secured to a trip rod 41, which latter is slidably connected beneath the support 10, and the spring 42 sleeved around this trip rod 41 holds it in its normal position, in the path of a trip 43 as shown in Fig. 2, which trip strikes the end of the rod 41 when the saw shall have completed its outward stroke, thereby forcing the trip rod 41 forward and with it bracket 38, the rod 37, and bumper 35 on the outer end thereof, causing the latter to impinge the bumper 36, thereby pushing the controlling rod 29 forward, and with it moving the valve-stem 32 to the position shown in Fig. 1, reversing the valve, and causing the fluid to flow through the pipe or hose 27 to the forward end of the cylinder 14, and in that way retrieving or withdrawing the saw to its normal starting position, at the same time separating the bumpers 35 and 36.

The fluid is supplied to the valve 28 through the main pipe 44. The valve itself rests upon a bracket 45 carried by the base plate 10. While the parts are set in motion as described by pressing the edge of the lumber against the gravity stop 34, and in that way moving the controlling rod 29 backward to rock valve-stem 32, provision is made for doing this by hand, and a hand-operated rod 46 with a hand-hold 47 is arranged within reach of the mill operator, and which rod 46 is connected with a rocker-lever 48 pivoted to the base plate 10. The lower end of this rocker-lever has loose connection with the controlling rod 29 which latter is connected with the valve-stem, as has been explained, and in that way the operation of the valve is always within direct control of the saw operator.

*Operation.*—The board to be sawed is placed on the rollers 50 of the table 51 in the usual manner, and when positioned for the cut, the operator pushes it back against the stop 34, on the end of the operating rod 29, thereby moving the latter backwardly, and the valve stem 32 with it. This opens the way through the valve 28 to the pipe or hose 26, and pressure is created at the outer end of the cylinder against the piston 20, thereby imparting an outer stroke to the saw, and on reaching the end of the stroke the bumper 35 is brought yieldingly against the bumper 36, pushing the operating rod 29 forward and with it the valve stem 32, reversing the valve, and causing the operating fluid to pass through the pipe or hose 27, thereby causing the backward stroke of the piston 20, as illustrated in Figs. 1, 3 and 5, and the return of the saw to its starting point ready to make another cut.

It is understood that in the operation of this machine, water, air, oil or steam may be used.

I claim:

1. In a straight-line cut-off saw, the combination of a suitable support, a saw, pressure means for moving the saw in and out of operative position, a valve for the control of the operating medium, means in position to be engaged by the stock to be sawed for operating the valve, means for automatically stopping the travel of the saw and for returning it to its starting position, cushion means for reversing the valve, a spring-actuated slide rod for moving the cushioning means, and a movable stop in position to be engaged by the rod at the end of the forward stroke of the sawing mechanism.

2. The combination of a support, a cylinder, a piston and piston-rod operating therein, sawing mechanism to which the piston-rod is attached, and whereby it is moved back and forth, slide rods, means for conducting a pressure medium to the cylinder on opposite sides of the piston, a valve for controlling the direction of movement of this pressure medium, means within the control of the operator for moving the valve in one direction, automatic means for reversing the valve at a predetermined interval, the valve operating means including an operating rod connected with the valve, a slidable trip rod, a trip in position to engage and move the rod, a cushion bumper connected with said trip rod and in position to yieldingly engage and move the operating rod at a predetermined interval whereby to cause the rod to move the valve in one direction.

3. The combination of a suitable support, a saw, fluid pressure means for moving the saw in and out of operative position, a valve for the control of the operating medium, means for shifting the valve to cause the saw to cross the path of the material to be sawed, a trip, a slidably mounted trip rod in the path of said trip, spring means for holding the trip rod in its normal position, a bracket secured to the trip rod, a spring-actuated rod slidably connected with the bracket, a controlling rod in the path of the spring-actuated rod, said controlling rod connected with the valve whereby to actuate the latter when the trip rod is engaged and moved forward by the trip.

4. The combination of a suitable support, a saw, fluid pressure means for moving the saw in and out of operative position, a valve for the control of the operating medium, means for shifting the valve to cause the saw to cross the path of the material to be sawed, a trip, a slidably mounted trip rod in the path of said trip, spring means for holding the trip rod in its normal position, a bracket secured to the trip rod, a spring-actuated rod slidably connected with the bracket, a controlling rod in the path of the spring-actuated rod, said controlling rod connected with the valve whereby to actuate the latter when the trip rod is engaged and moved forward by the trip, a cylinder, a piston therein, the movement of which is controlled by the valve, a piston-rod connected with and adapted to move the saw mechanism back and forth and slide-rods, the latter with the piston-rod affording the sole support of the saw.

5. The combination of a suitable support, a saw, fluid pressure means for moving the saw in and out of operative position, a valve for the control of the operating medium, means for shifting the valve to cause the saw to cross the path of the material to be sawed, a trip, a slidably mounted trip rod in the path of said trip, spring means for holding the trip rod in its normal position, a bracket secured to the trip rod, a spring-actuated rod slidably connected with the bracket, a controlling rod in the path of the spring-actuated rod, said controlling rod connected with the valve whereby to actuate the latter when the trip rod is engaged and moved forward by the trip, a cylinder, a piston therein, the movement of which is controlled by the valve, a piston-rod connected with and adapted to move the saw mechanism back and forth, base and top plates connected with the cylinder and located on opposite sides thereof, one removable from the other, slide rods guided between said base and top plates, and having their forward ends connected with the saw mechanism, and with the piston-rod forming the moving support for the sawing mechanism.

RICHARD H. CROUCH.